United States Patent
Cheung et al.

(10) Patent No.: US 10,628,397 B2
(45) Date of Patent: Apr. 21, 2020

(54) NAVIGATION OF DATA SET PREPARATION

(71) Applicant: Microsoft Technology Licensing, LLC, Redmond, WA (US)

(72) Inventors: Chairy Cheung, Redmond, WA (US); Taurean Jones, Issaquah, WA (US); Euan Peter Garden, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 228 days.

(21) Appl. No.: 15/283,193

(22) Filed: Sep. 30, 2016

(65) Prior Publication Data

US 2018/0095644 A1  Apr. 5, 2018

(51) Int. Cl.
*G06F 3/0484* (2013.01)
*G06F 16/215* (2019.01)

(52) U.S. Cl.
CPC .................. *G06F 16/215* (2019.01)

(58) Field of Classification Search
CPC .... G06F 3/04845; G06F 3/0482; G06F 17/24; G06F 17/211
See application file for complete search history.

(56) References Cited

U.S. PATENT DOCUMENTS

| | | | |
|---|---|---|---|
| 7,373,605 B2 | 5/2008 | Schaper | |
| 7,882,440 B2 | 2/2011 | Mohr | |
| 7,908,555 B2 | 3/2011 | Zellner | |
| 8,040,360 B2 | 10/2011 | Louch | |
| 8,117,557 B2 | 2/2012 | Dotson et al. | |
| 9,056,539 B2 | 6/2015 | Mirza et al. | |
| 2004/0252074 A1* | 12/2004 | Schaper | G06F 3/1431 345/1.1 |
| 2007/0100992 A1 | 5/2007 | Wong et al. | |
| 2009/0319944 A1 | 12/2009 | Chikkegowda et al. | |

(Continued)

FOREIGN PATENT DOCUMENTS

WO  2014181318 A1  11/2014

OTHER PUBLICATIONS

CustomGuide, "Excel 2016 Training", http://www.customguide.com/excel-2016-training/, "Formula Errors", archived: Mar. 2, 2016: https://web.archive.org/web/20160302091419/http://www.customguide.com:80/excel-2016-training/formula-errors-courseware (Year: 2016).*

(Continued)

*Primary Examiner* — Seth A Silverman
(74) *Attorney, Agent, or Firm* — Workman Nydegger

(57) ABSTRACT

A user interface having components that each provide a view on underlying data, and controls for preparing the data. This allows the user to have a wide variety of views on the data set, and corresponding controls appropriate for that view. The level of control over data preparation is even further enhanced by a selection control and navigation control. The selection control allows a portion of the view to be selected, which would in turn affect the view(s) displayed in one or more other user interface components. The navigation control causes the user interface components to display views on the data set as that data set existed at various prior stages in data preparation. The selection control remains active even when viewing prior stages of the data set.

21 Claims, 17 Drawing Sheets

(56) References Cited

U.S. PATENT DOCUMENTS

| | | | |
|---|---|---|---|
| 2013/0328913 A1 | 12/2013 | Nassar | |
| 2014/0152541 A1* | 6/2014 | Murarka | G06F 3/0488 345/156 |
| 2014/0232723 A1* | 8/2014 | Jain | G06T 11/206 345/440 |
| 2015/0347711 A1* | 12/2015 | Soli | H04W 4/90 705/3 |
| 2016/0224532 A1 | 8/2016 | Miller et al. | |

OTHER PUBLICATIONS

Harvey, "Microsoft Excel 2010 All-In-One for Dummies", copyright: 2010, Wiley Publishing Inc. (Year: 2010).*

Basu, Saikat, "Easily View Multiple Tabs At Once with These Chrome Extensions", Published on: Oct. 2, 2013 Available at: http://www.makeuseof.com/tag/easily-view-multiple-tabs-at-once-with-these-chrome-extensions/.

"OS X: How to use multiple displays with your Mac in Mountain Lion and earlier", Published on: Jan. 27, 2015 Available at: https://support.apple.com/en-in/HT202351.

"Multiple view controllers on screen at once?", Retrieved on: Jul. 8, 2016 Available at: http://stackoverflow.com/questions/2423858/multiple-view-controllers-on-screen-at-once.

"Non Final Office Action Issued in US Appl. No. 15/283,190", dated Jun. 18, 2018, 34 Pages.

"Final Office Action Issued in U.S. Appl. No. 15/283,190", dated Dec. 17, 2018, 29 Pages.

"Non Final Office Action Issued in U.S. Appl. No. 15/283,190", dated May 17, 2019, 33 Pages.

"Final Office Action Issued in U.S. Appl. No. 15/283,190", dated Sep. 10, 2019, 40 Pages.

\* cited by examiner

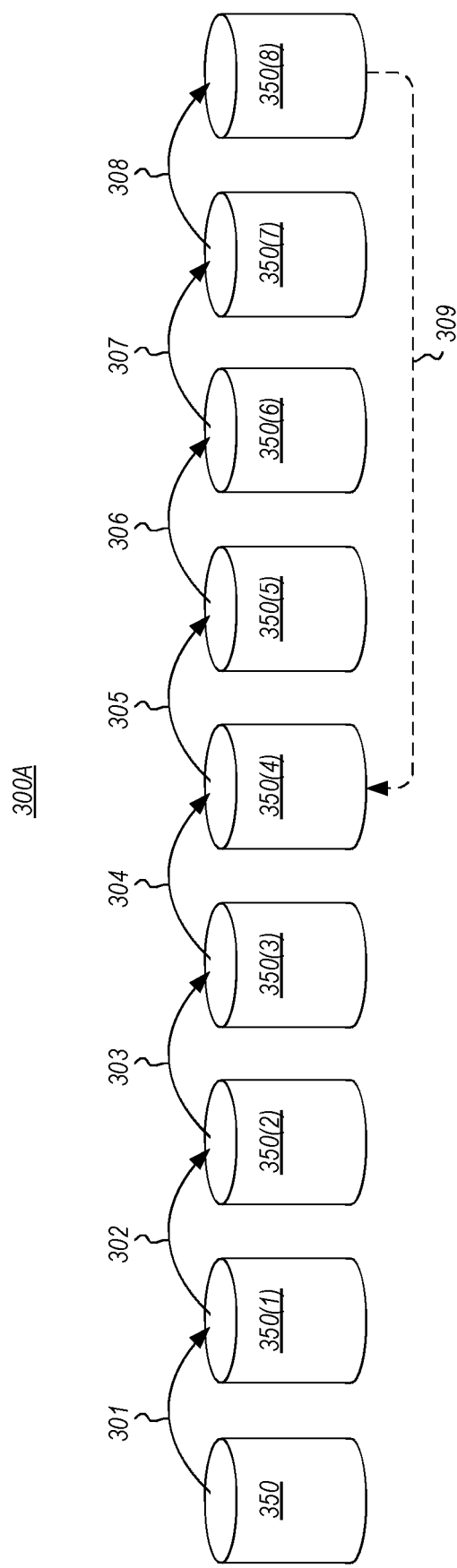
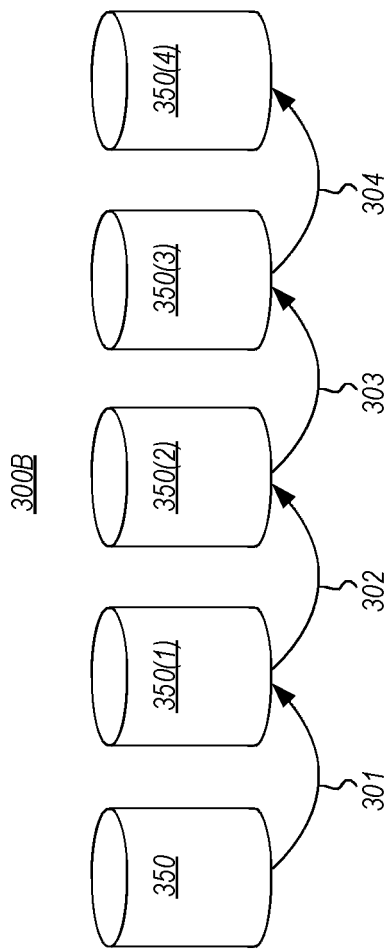
Figure 3A
Figure 3B

_700_

| | abc Name | abc Language | Birth | Death | abc First. Public | abc Last. Public | abc Published | abc Notes |
|---|---|---|---|---|---|---|---|---|
| 1 | Jacob M. Appd | English | 1973-02-21TO | null | 1998 | | 200 + | Has also recei... |
| 2 | Isaac Asimov | English | null | 1992-04-06TO | | | 536[10] | Published in 9... |
| 3 | Kyokutei Bakin | Japanese | 1767-07-04TO | 1848-12-01TO | | | 470[13] | |
| 4 | Ursula Bloom | English | 1892-01-11TO | 1984-01-01TO | 1922 | | 530+[14] | |
| 5 | Enid Blyton | English | 1897-08-11TO | 1968-11-28TO | | | 600-[2] | |
| 6 | Edwy S. Brooks | English | 1889-11-11TO | 2065-12-02TO | 1907 | 1966 | 800+[9] | Brooks publis... |
| 7 | Barbara Cartla | English | 2001-07-09TO | 2000-05-21TO | 1923 | | 722[2] | Holds the Gui... |
| 8 | John Creasey | English | 2008-09-17TO | 1973-06-09TO | | | 600+[15] | More than 10... |
| 9 | Terrance Dicks | English | 2035-05-10TO | null | 1974 | | 223 | Mainly childre... |
| 10 | Darya Dontso... | Russian | 2062-06-07TO | null | | | 140+[16] | A bestselling... |
| 11 | Alexandra Du... | French | 1802-07-24TO | 1870-12-05TO | | | 277[2] | |
| 12 | Howard R. Ga... | English | 1873-04-25TO | 2062-11-06TO | | | 500+[7] | Member of th... |
| 13 | Charles Garvice | English | 1850-08-24TO | 2020-03-01TO | | | 150+[17] | Mostly books... |
| 14 | Meish Goldish | English | null | null | 1989? | | 300- | |
| 15 | Abu Hamad | Arabic | null | null | | | 200 | Figh, Sufism,... |
| 16 | Charles Hamilton | English | 1876-08-08TO | 2061-12-24TO | 1894 | 1961 | 1200 | Estimated to h... |

» INSPECTORS
Histogram: First Publication

_622_

Column Statistics: First Publication

Data Not Applicable
_623_

Steps  _620_
- Load from CSV Data Source
- Covert Field Type to Date
- Convert Field Type to Data
- Filter
- Convert Field Type to Numeric
- Filter
- Filter
- Convert Field Type to Numeric
- Convert Field Type to Numeric
- Add Column by Example
- Convert Field Type to Numeric
- Filter
- Remove Rows with Missing Values
- Auto-Split Column
- Filter
- Remove Rows with Missing Values
- Add Column by Example
- Add Column by Example

_621_

Value Count: Death

_624_

Data Not Applicable

*Figure 7*

NAVIGATION OF DATA SET PREPARATION

BACKGROUND

In the information age, it is important to be able to efficiently and effectively evaluate data. There exists a variety of software programs that are capable of providing a variety of views on a variety of data sets. In order to most effectively process and evaluate some data sets, it is helpful to prepare the data for most effective and efficient use. For instance, data may be prepared by removing redundant data from the data set, removing undesired fields from the data set, reformatting fields of the data set, combining fields of the data set, filtering the data set, and so forth. By evaluating a more compact and relevant data set, the experience of analyzing the data set may be improved and made more efficient.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Properly prepared data sets provide significant advantages to those programs for which the data set is prepared. However, it is not an easy task to efficiently and correctly prepare a data set. It is not easy to have an understanding and context for what data should be removed, which fields are most relevant, what formats are best, and so forth. It is easy to make a mistake in preparing the data, leading to potential inefficiencies and inaccuracies in the data itself. The principles described herein provide a user interface that allows for fine-grained and intuitive control over the preparation data, thereby allowing for more efficient and accurate preparation of the data. Data preparation may also be efficiently reversed to allow for a change in course in the data preparation.

The principles described herein provide a user interface that includes multiple components that each provide a view on the underlying data set, and also provide controls for preparing the data set. This allows the user to have a wide variety of views on the data set, and corresponding controls appropriate for that view. Thus, the user can take the most efficient and intuitive approach to editing or preparing the data, thereby allowing data preparation to be more efficient, intuitive and likely correct.

The level of control is further enhanced by a selection control and a navigation control. The selection control allows a portion of the view (e.g., a column in a grid-view) to be selected, which would in turn affect the view(s) displayed in one or more other user interface components. For instance, a summary view might be based on which column is selected in a grid view. The navigation control causes the user interface components to display views on the data set as that data set existed at various prior stages in data preparation. The selection control remains active even when viewing prior stages of the data set, allowing the selected portion of a particular view to change, and allowing corresponding propagated changes in the one or more other views. Data set preparation may even be undone to that prior stage, allowing preparation to take a different direction.

Thus, efficient data preparation can occur with full opportunity to view the history of the data preparation, and even change course from a prior stage of preparation. Thus, data preparation can be more efficiently performed and corrected. This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 3A illustrates an example time-flow of a data set as it undergoes various stages of preparation. FIG. 3B shows the example time-flow data set of FIG. 3A after having navigated back to the data set 350(4);

FIGS. 6 through 18 illustrated a more specific example user interface and is used as a walkthrough to show various features consistent with the principles described herein;

FIG. 6 illustrates an initial user interface showing various views of a data set after an eighth stage of preparation;

FIG. 7 illustrates a user interface which shows how the user interface of FIG. 6 changes if the user uses the navigation pane to navigate to the fourth stage of the data preparation—a filtering stage;

FIG. 8 illustrates a user interface which shows how the user interface of FIG. 7 changes if the user uses the navigation pane to navigate to the fifth stage of the data preparation, which is converting the selected values to numeric values;

FIG. 9 illustrates a user interface which shows how the user interface of FIG. 8 changes if the user uses the navigation pane to navigate to the sixth stage of preparation—a filtering stage;

FIG. 10 illustrates a user interface which shows how the user interface of FIG. 9 changes if the user uses the navigation page to navigate through the seventh stage (another filtering stage) and to the eighth stage of preparation—a conversion of the selected field type to numeric;

FIG. 11 illustrates a user interface which shows how the user interface of FIG. 10 changes if the user uses the navigation pane to navigate to the ninth stage of operation, which again converts field types to a numeric field type, causing the underlying data set to change, which change propagates through all views, just as in all other stages;

FIG. 12 illustrates a user interface which shows how the user interface of FIG. 11 changes if the user uses the navigation pane to navigate to the eleventh stage of operation, which again converts field types to a numeric field type (after having added a column by example in the tenth stage), causing the underlying data set to change, which change propagates through all views, just as in all other stages;

FIG. 13 illustrates a user interface which shows what happens if the user promotes the histogram view in FIG. 12;

FIG. 14 illustrates a user interface that shows that the user may use the promoted view to select a different portion of the data set to perform an operation on, even though this is a prior stage of data preparation;

FIG. 15 illustrates the user interface after this filtering has been performed, which caused changes to the content to the data statistics view and the column statistics view, and caused the three entries (the top three) in the value count view corresponding to the selected bar to be highlighted;

FIG. 16 illustrates the user interface after the user selects another bar of the bar chart view, causing a new detail popup to appear;

FIG. 17 illustrates the user interface of FIG. 16 when the user selects another portion of the data set; and FIG. 18 illustrates the user interface of FIG. 17 when navigating back one stage.

DETAILED DESCRIPTION

Figure 1:
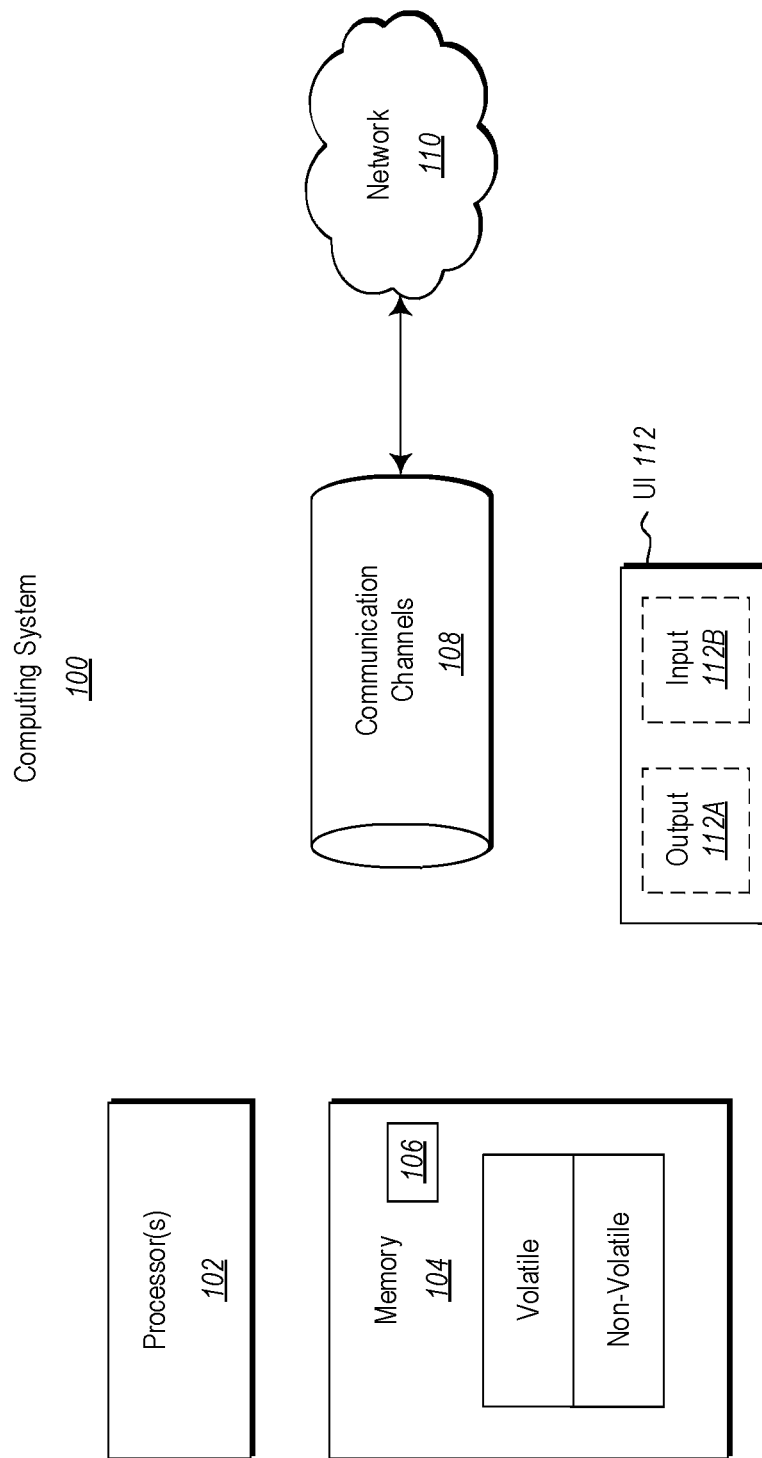
FIG. 1 illustrates a computing system in which the principles described herein may operate.

Properly prepared data sets provide significant advantages to those programs for which the data set is prepared. However, it is not an easy task to efficiently and correctly prepare a data set. It is not easy to have an understanding and context for what data should be removed, which fields are most relevant, what formats are best, and so forth. It is easy to make a mistake in preparing the data, leading to potential inefficiencies and inaccuracies in the data itself. The principles described herein provide a user interface that allows for fine-grained and intuitive control over the preparation data, thereby allowing for more efficient and accurate preparation of the data. Data preparation may also be efficiently reversed to allow for a change in course in the data preparation.

The principles described herein provide a user interface that includes multiple components that each provide a view on the underlying data set, and also provide controls for preparing the data set. This allows the user to have a wide variety of views on the data set, and corresponding controls appropriate for that view. Thus, the user can take the most efficient and intuitive approach to editing or preparing the data, thereby allowing data preparation to be more efficient, intuitive and likely correct.

The level of control is further enhanced by a selection control and navigation control. The selection control allows a portion of the view (e.g., a column in a grid-view) to be selected, which would in turn affect the view(s) displayed in one or more other user interface components. For instance, a summary view might be based on which column is selected in a grid view. The navigation control causes the user interface components to display views on the data set as that data set existed at various prior stages in data preparation. The selection control remains active even when viewing prior stages of the data set, allowing the selected portion of a particular view to change, and allowing corresponding propagated changes in the one or more other views. Data set preparation may even be undone to that prior stage, allowing preparation to take a different direction.

Thus, efficient data preparation can occur with full opportunity to view the history of the data preparation, and even change course from a prior stage of preparation. Thus, data preparation can be more efficiently performed and corrected. Because the user interface is provided by a computing system on a display of the computing system, a computing system will first be described with respect to FIG. 1. Then, the user interface in accordance with the principles described herein, and the underlying computing technology that causes that user interface to be presented, will be described with respect to FIGS. 2 through 18.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses, watches, bands, and so forth). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "service", "engine", "module", "virtual machine", "scheduler", "manager", "compiler", or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface 112 for use in interfacing with a user. The user interface 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, projectors, tactile output, valves, actuators, holograms, virtual reality, and so forth. Examples of input mechanisms 112B might include, for instance, microphones, touchscreens, holograms, virtual reality controls, cameras, keyboards, accelerometers, levers, pedals, buttons, knobs, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

Figure 2:
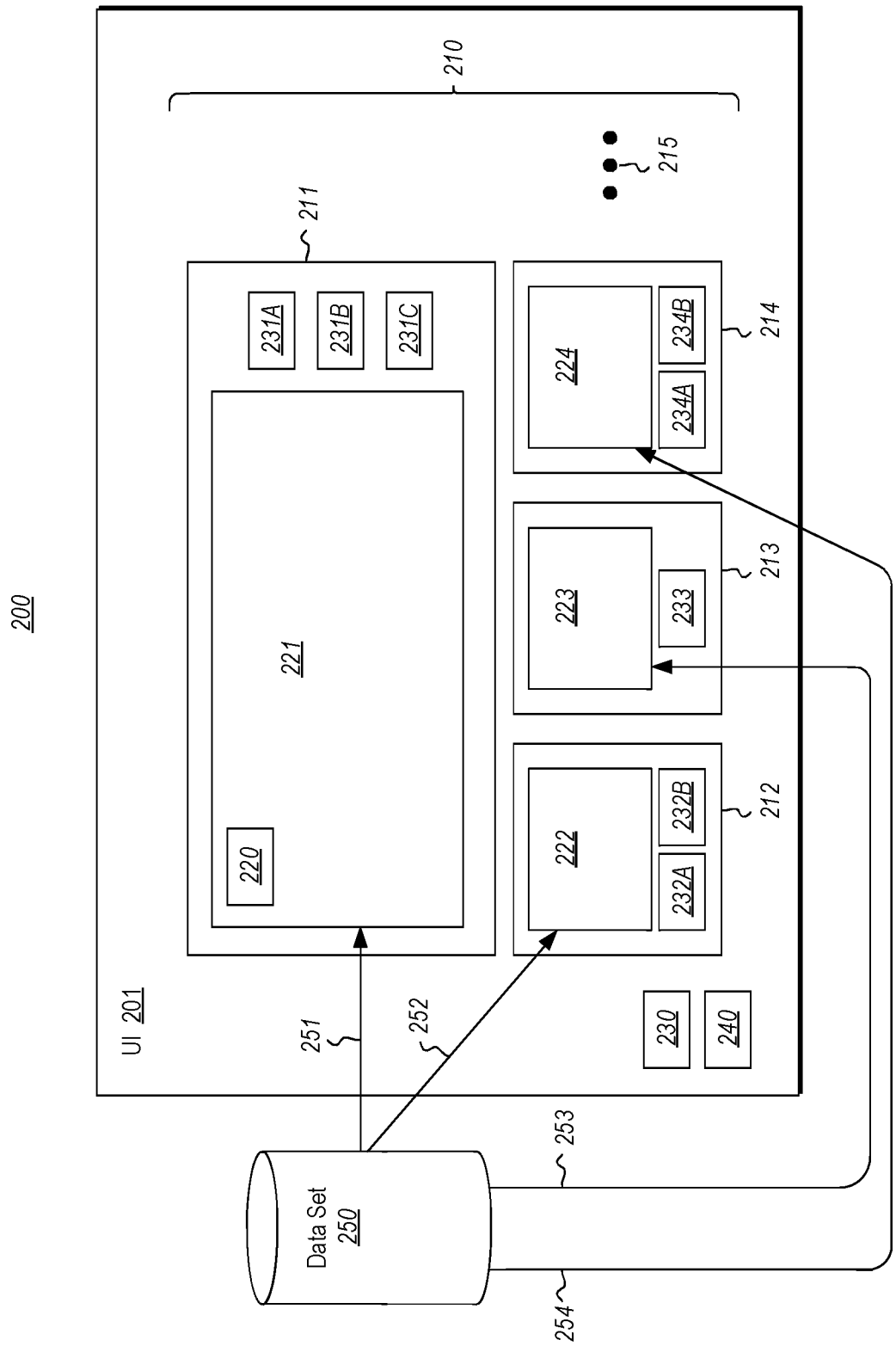
FIG. 2 illustrates a user interface environment that displays a user interface that has multiple components that provide distinct views on underlying data sets, each view having controls for editing the data.

FIG. 2 illustrates a user interface environment 200 that displays a user interface 201. As an example, the user interface environment 200 might be a display for displaying the user interface 201, as well as one or more input devices for interfacing with controls of the user interface 201. If the user interface environment 200 were operated with the computing system 100 of FIG. 1, the display might be, for example, one of the output mechanisms 112A described above. In that case, the input devices might be one of the input mechanisms 112B described above. The precise input and output mechanisms for interfacing with the user interface 201 are not important to the broader principles described herein.

The user interface 201 displays multiple user interface components 210 including user interface components 212, 213 and 214. Although the principles described herein are not limited to the number of user interface components (as represented by ellipses 215), there are four user interface components 211 through 214 illustrated within FIG. 2. In one user experience, the user interfaces may be opened and closed in response to events (such as user interaction), and thus the number of available user interface components may vary over time. User interface components of one type may also be replaced with user interface of another type, and/or may be moved throughout the layout.

The layout of the user interface components 210 within the user interface 201 is for purposes of example only. The principles described operate regardless of where the user interface components are laid out, and their precise shape and size. Furthermore, the principles described herein are not limited to providing any particular view on any particular data set. The principles described herein operate just as well regardless of the view types being shown, and regardless of the data in the data set.

Each of the user interface components 211 through 214 provides a corresponding different view 221 through 224 of the underlying data set 250 (as represented by respective arrows 251 through 254). The user interface component 211 displays the view 221 on the data set. The user interface components 212 through 214 likewise each display a corresponding view 222 through 224, respectively, of the data set 250. Although not required, in one embodiment, the user interface component 211 displayed a more detailed view, and the user interface components 212 through 214 illustrates summary views.

In one embodiment, there is a selection control 220 that allows the user to select a portion of the data set 250. For instance, the selection control 220 might allow the user to select a set of one or more tables, rows, and/or columns of the data set 250, if the data set 250 has a table-like structure. If the selection control 220 is used to select a portion of a view (e.g., view 221) displayed on at least a particular one (e.g., 211) of the user interface components one of the other views in the one or more other user interface components changes to reflect the selection. For instance, in the example in which the view 221 is a detailed view showing a grid view. The user might use the selection control to select a column of a table. One or more of the summary views 222, 223, and/or 224 might also change their content based on that selection.

Each of the user interface components 210 has one or more controls that may be used to change the data set 250. For instance, the user interface component 211 is illustrated as including three controls 231A, 231B, and 231C that are used to change the data set 250 (as compared to the selection control 220 which is used for selecting data of the data set 250). The user interface component 212 is illustrated as including controls 232A and 232B for changing the data set 250. The user interface component 213 is illustrated as including control 233 for changing the data set 250. Lastly, the user interface component 214 is illustrated as including controls 234A and 234B for editing the data set 250.

Such controls may be suitable for editing and/or preparing of the data set 250. As an example, the controls may be used to remove data that is not of interest, such as redundant data, or information that is simply not relevant to the consumer of the data set 250. Alternatively, or in addition, the controls may be used to change the format of the data. For instance, strings may be converted to numbers; dates of one format may be changed to another, the data may be sorted by certain field values, and so forth.

The type of preparation that is enabled by a particular control may be based on the type of information that is most intuitively expressed by the corresponding view that includes that particular control. Accordingly, the number of data preparation controls illustrated with respect to a user interface component may be different depending on the type of data preparation that is most intuitively accessed from that particular control. Thus, the precise number of controls illustrated in FIG. 2 should be seen as just an example.

Accordingly, the user that wishes to edit the data set 250 may dive into that editing in the way that is most intuitive for that user, given that there are multiple ways to edit the data set 250. Furthermore, once the user edits the data set 250, the effect of that change may be propagated to each view (as also represented by the arrows 251 through 254). For instance, suppose that a view shows a raw table view of the data set 250. Such a view might allow a user to more intuitively select a value, and remove all portions of the data that are associated with that value. This, in turn, might have an effect on a statistical summary view in which the statistics of that value were being displayed.

The user interface also includes a navigation control 230. When interacted with, the navigation control 230 allows the user to cause the user interface components to display views on the data set as the data set existed at a prior stage. For instance, FIG. 3A illustrates an example time-flow 300A of a data set as it undergoes various stages of preparation. At stage 0, the data set 350 is simply accessed. At each stage of operation (represented by solid-lined arrows 301 through 308), the data set changes. For instance, after stage one, the data set 350 changes to data set 350(1). This occurs in the illustrated example for eight stages resulting in data set 350(8) after the eighth stage of preparation. Each stage was performed by interfacing with one or more of the user interface controls to change the underlying data set.

The navigation control 230 may then allow the user to navigate back to the views as they would be on a prior stage of the data set. For instance, the arrow 309 represents a navigation back to the data set 350(4) that existed after the fourth stage of preparation. Thus, although the user prepared the data to become data set 350(8), the various user interface components are instead showing a view on the data as it existed when it was data set 350(4).

No matter which stage of the preparation of the data set that the views are representing, the selection control 220 remains operative. That is, even when displaying views on a prior stage of the data set, the selection control 220 may still be used to select a portion of a view displayed in the particular user interface component thereby changing at least one of the views in at least one of the one or more other user interface components. For instance, perhaps after having conducted eight stages of data preparation (creating data set 350(8)), the user now wishes to navigate back to the data set 350(4) as it existed after the fourth data set. The user may still use the selection control to specify what portion of the data is being viewed.

The navigation control 230 may also include an undo control for underdoing preparation of the data set to return the data set itself to the prior stage navigated to with the navigation control. For instance, after having navigated back to the data set 350(4), or perhaps even without navigating to that point, the user may select to undo the data preparation made after that data set. The net result would be as shown in FIG. 3B.

Figure 4:
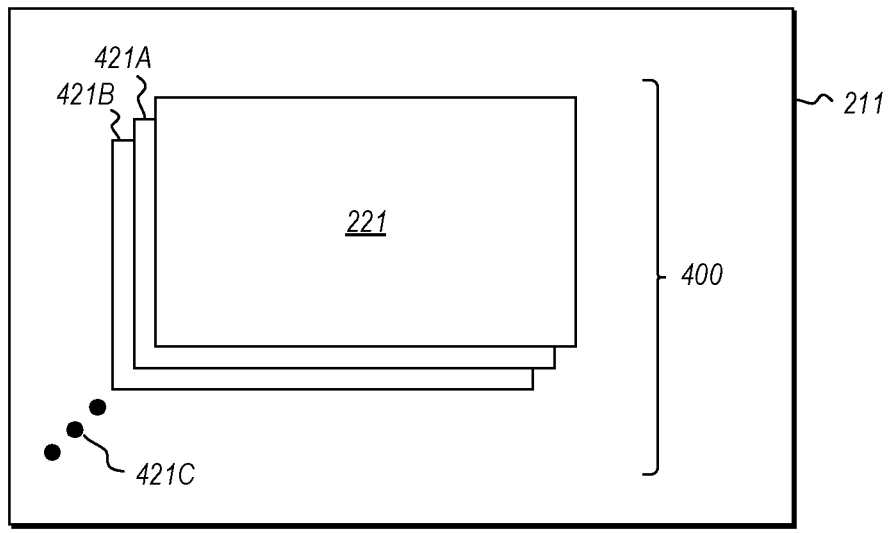
FIG. 4 illustrates a stacking of views in the detail user interface component in which the visible detail view is merely the top of a stack of other detail views.

A view 221 displayed in the user interface component 211 may actually be stacked with one or more other views, where only the top view is visible. For instance, FIG. 4 illustrates a stacking 400 of views in the user interface component 211 in which the view 221 is merely the top of a stack of other views including view 421A and 421B. The ellipses 421C represent that this stack may be of any depth and may change dynamically as views are removed from the stack. Likewise, the views displayed in any of the summary user interface components may likewise be stacked with one or more other summary views.

An exposing control 240 may be used for exposing on top of the user interface component a view that was not previously on top of that stack. As an example, the most recently accessed view may automatically be placed on top of the user interface component. Thus, the exposing control 240 may be more of a view access control. The exposing control 240 might alternatively be a minimize control that minimizes a detail view that was on the top of the user interface component to expose an immediately underlying view in the user interface component. The exposing control 240 might be a close control that closes the view that was on top of the user interface component to expose an immediately underlying view in the user interface component.

Figure 5:
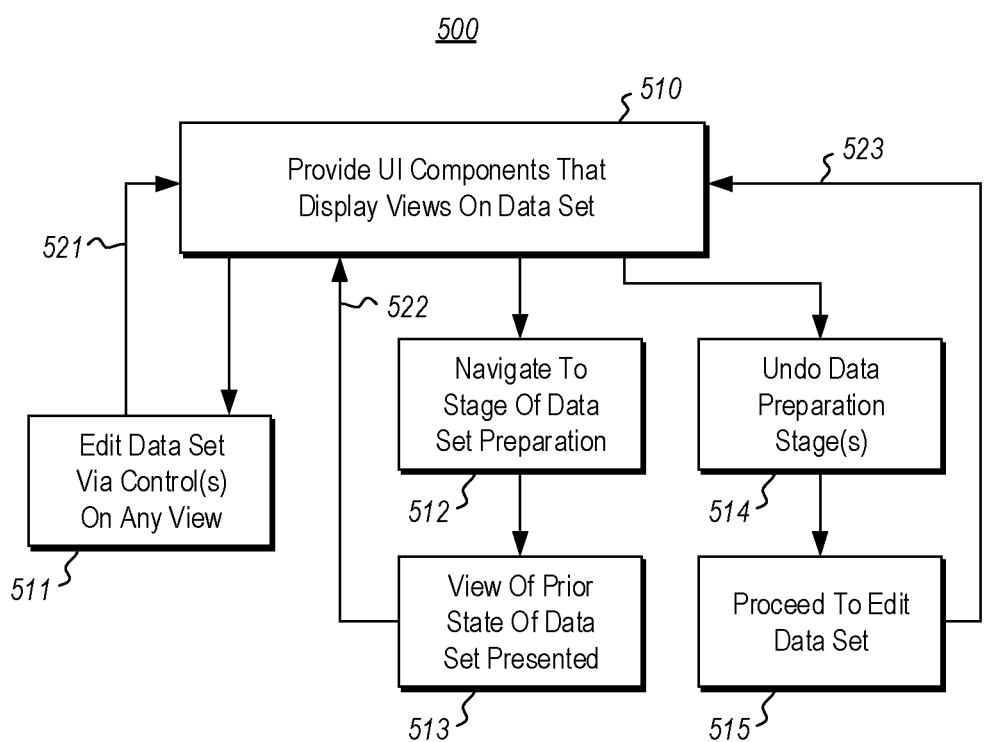
FIG. 5 illustrates a flowchart of a method for causing a user interface to be displayed on a display of a computing system.

FIG. 5 illustrates a flowchart of a method 500 for causing a user interface to be displayed on a display of a computing system. While much of the flow of the method 500 has been described already, it will be made more explicit with respect to FIG. 5. First, multiple user interface components are displayed such that each user interface component displays a different view on a data set (act 510). An example, of such user interface components are illustrated in FIG. 2. At this point, one of several things might happen.

At this point, the data set could be altered (act 511) in response to detection of user interaction with any of the controls that edit or prepare the data, regardless of which user interface component that control appears in. There is no limit to the number of times (zero or more or many) that this editing of act 511 may be repeated (as represented by arrow 521). This causes the data set to undergo several stages of preparation as previously described.

Another thing that could happen is that the user might navigate to a particular stage of preparation (act 512). As previously described, this causes a view on the data set as it previously existed at that prior stage to be revealed via the views. (act 513). There is no limit to the number of times (zero or more or many) that this navigation of acts 512 and 513 may be repeated (as represented by arrow 522).

Finally, while in the act of navigating to a particular stage of data preparation, or at any other time, the user might undo the data preparation performed to a particular point (act 514). This would allow the user to proceed with data preparation in perhaps a different direction (act 515). There is no limit to the number of times (zero or more or many) that this undoing of acts 514 and 515 may be repeated (as represented by arrow 523).

Accordingly, the principles described herein provide a user interface that includes multiple components that each provide a view on the underlying data set, and also provide controls for preparing the data set. The level of control is further enhanced by a selection control and navigation control. The selection control allows a portion of the view (e.g., a column in a grid-view) to be selected, which would in turn affect the view(s) displayed in one or more other user interface components. For instance, a summary view might be based on which column is selected in a grid view. The navigation control causes the user interface components to display views on the data set as that data set existed at various prior stages in data preparation. The selection control remains active even when viewing prior stages of the data set, allowing the selected portion of a particular view to change, and allowing corresponding propagated changes in the one or more other views. Data set preparation may even be undone to that prior stage, allowing preparation to take a different direction. Thus, efficient data preparation can occur with full opportunity to view the history of the data preparation, and even change course from a prior stage of preparation.

Figure 6:
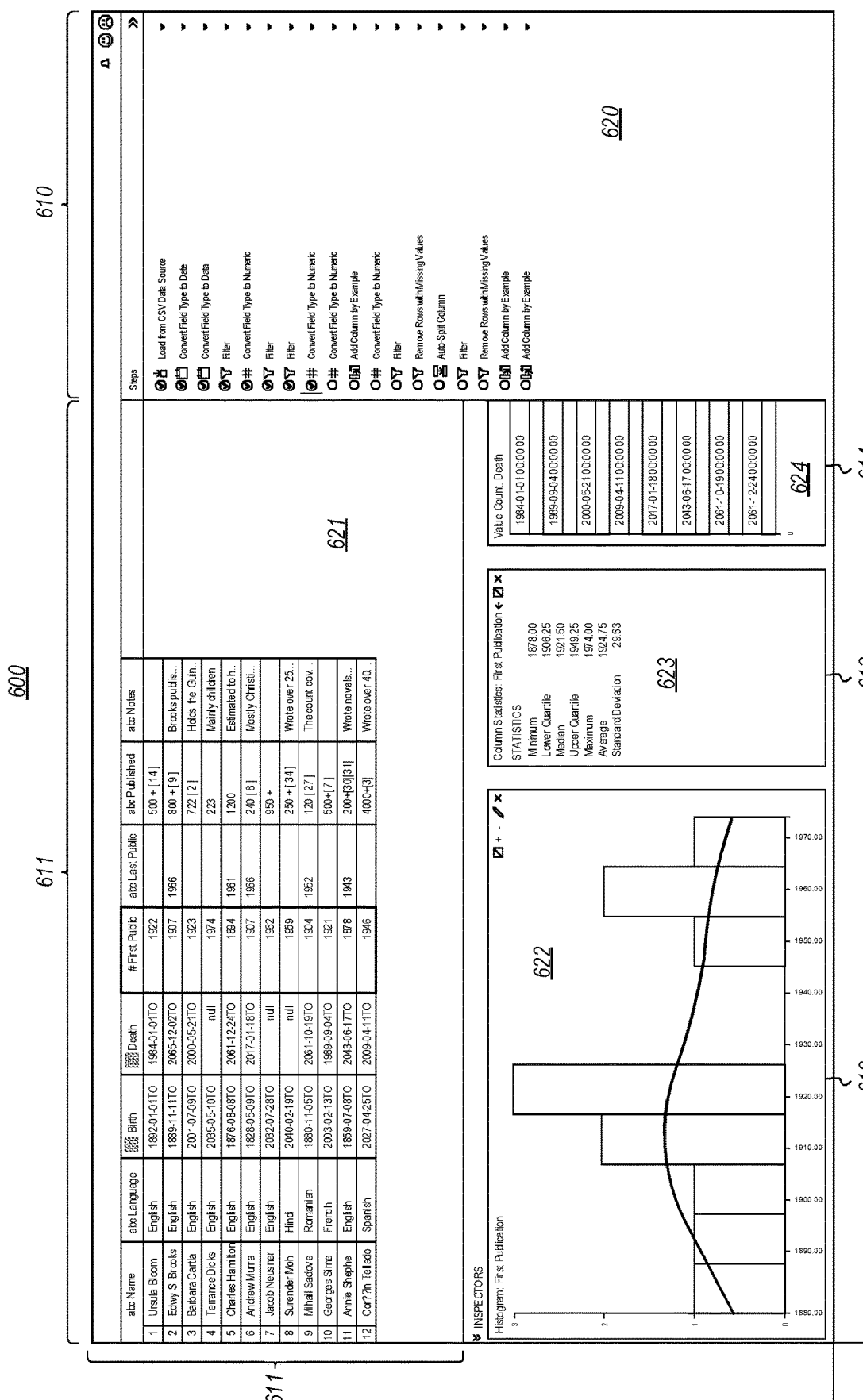

Having now described the broad principles with respect to FIGS. 2 through 5, a specific user interface example and flow will be described with respect to FIGS. 6 through 18. FIG. 6 illustrates a user interface 600, which includes a navigation user interface component 620, and four view user interface components 621 through 624.

The navigation pane 620 illustrates a stage of the alteration of the underlying data set that is being viewed within the view user interface components 621 through 624. In the state of FIG. 6, the data is in its eighth (of eighteen) stage of preparation. Completed stages are identified. Furthermore, in the case that the data preparation goes through predetermined stages, the remaining stages are also illustrated, but shown as not yet performed. Alternatively, perhaps all eighteen stages have been previously performed, but the user has navigated back to the views on the data set as the data existed after the eighth stage.

As the data is edited, a stage is added to the navigation pane 620; or, if the data preparation stages are predetermined, then the stage is marked as complete. The navigation pane 620 represents an example of the control 240 of FIG. 2. The navigation pane 620 may also be used to navigate to a prior stage in editing of the data. For instance, in FIG. 6, if there are eighteen completed stages, the user could navigate to any of the completed eighteen stages to show views on the data as its existed at that stage. In FIG. 6, the user has navigated to the eighth stage, in which stage the selected field was changed to a numeric format.

The user interface component 611 shows the detail view 621, which is at this stage a grid view of a table that lists various prolific authors. The column selected includes values of the year that the author first published. The summary user interface components 612, 613 and 614 shows various summary views on the selected year of death. In this grid view, the column headers show a header title including (from left to right) Name, Language, Birth, Death, First Public (meaning First Publication), Last Public (meaning Last Publication), Published and Notes. The headers each include a prefix that identifies the types of the values in that column. An "abc" prefix denotes that the column includes string values. A "#" prefix denotes that the column includes numeric values. A desk calendar icon is used as a prefix to denote that the column includes date values.

Summary user interface component 612 shows a summary view 622 in the form of a histogram plotting (using bars), the year on the horizontal axis, and the number of authors first publishing in that year on the vertical axis. Summary user interface component 613 shows a column statistics view 623 that shows statistics for the column including the minimum value, the lower quartile threshold value, the median value, the upper quartile threshold value, the maximum value, the average value, and the standard deviation of the values of the selected column of the detail value. Summary user interface component 614 shows a value count view 624 for the column entitled "Death", which is not selected in FIG. 6, but which includes the date of death for each author, and no value if there is no date of death.

FIG. 7 illustrates a user interface 700 which shows how the user interface 600 of FIG. 6 changes if the user uses the navigation pane 620 to navigate to the fourth stage of the data preparation—a filtering stage. The data displayed in the detailed view 621 is changed somewhat so as to show the data as its existed after that fourth stage. Note that the histogram user interface component 622 has no data since the histogram consumes numeric values, and the values of the selected column are still strings, and are not converted to numeric values until the fifth stage. The statistics user interface component 623 likewise is shown blank for the same reason. The Value Count user interface component 624 is shown as unfilled also because the values from the "Death" column still need filtering (in the seventh stage) before those fields can be populated.

Figure 8:
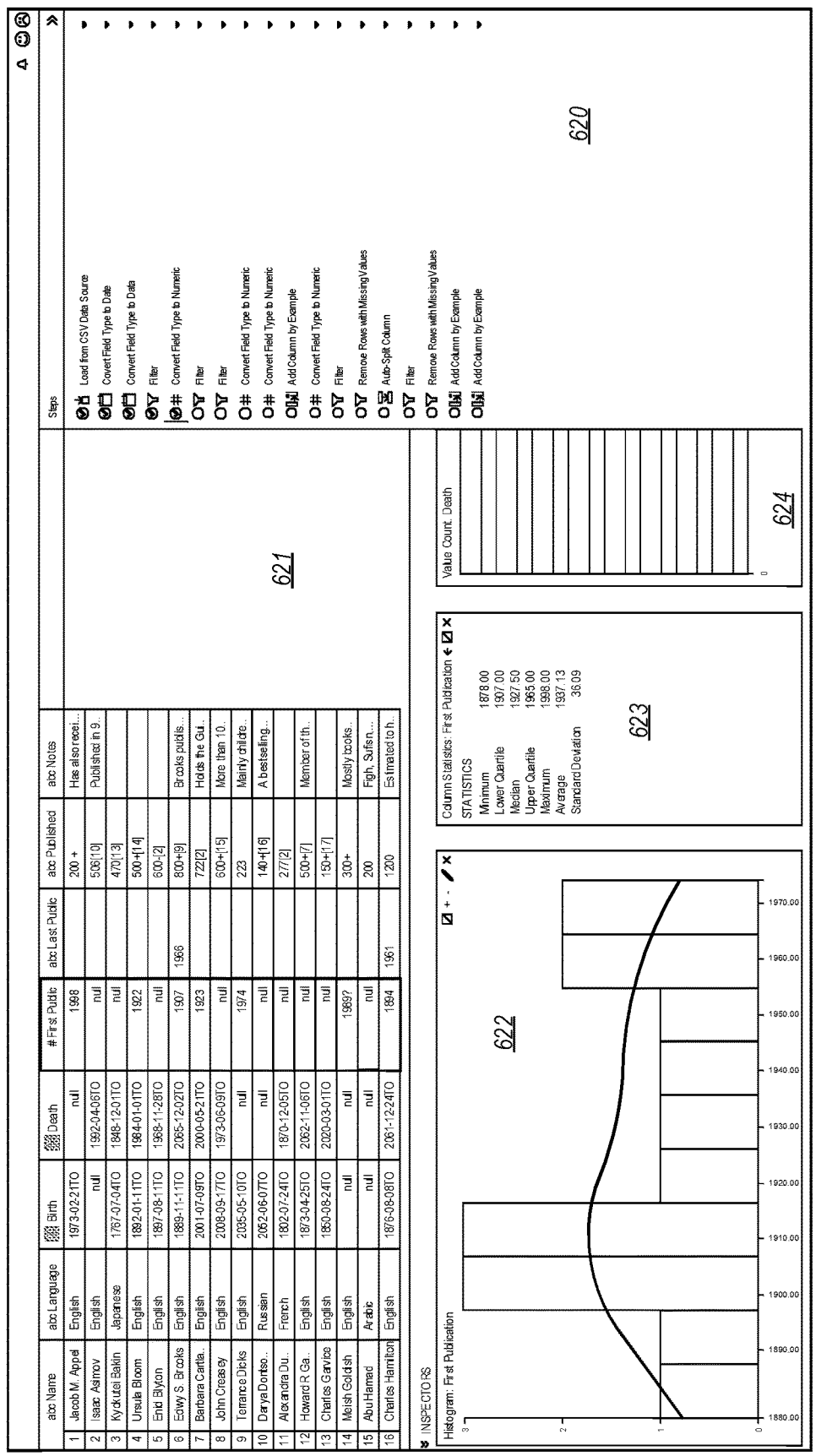

FIG. 8 illustrates a user interface 800 which shows how the user interface 700 of FIG. 7 changes if the user uses the navigation pane 620 to navigate to the fifth stage of the data preparation, which converts the selected values to numeric values. This conversion allows the histogram user interface component 622 and the statistics user interface component 623 to now be filled with meaningful summary information (i.e., a histogram and statistics, respectively) of the selected column, because the selected First Public column now includes numeric values. The fifth stage has not caused the view of the value count user interface component 624 to change.

Figure 9:
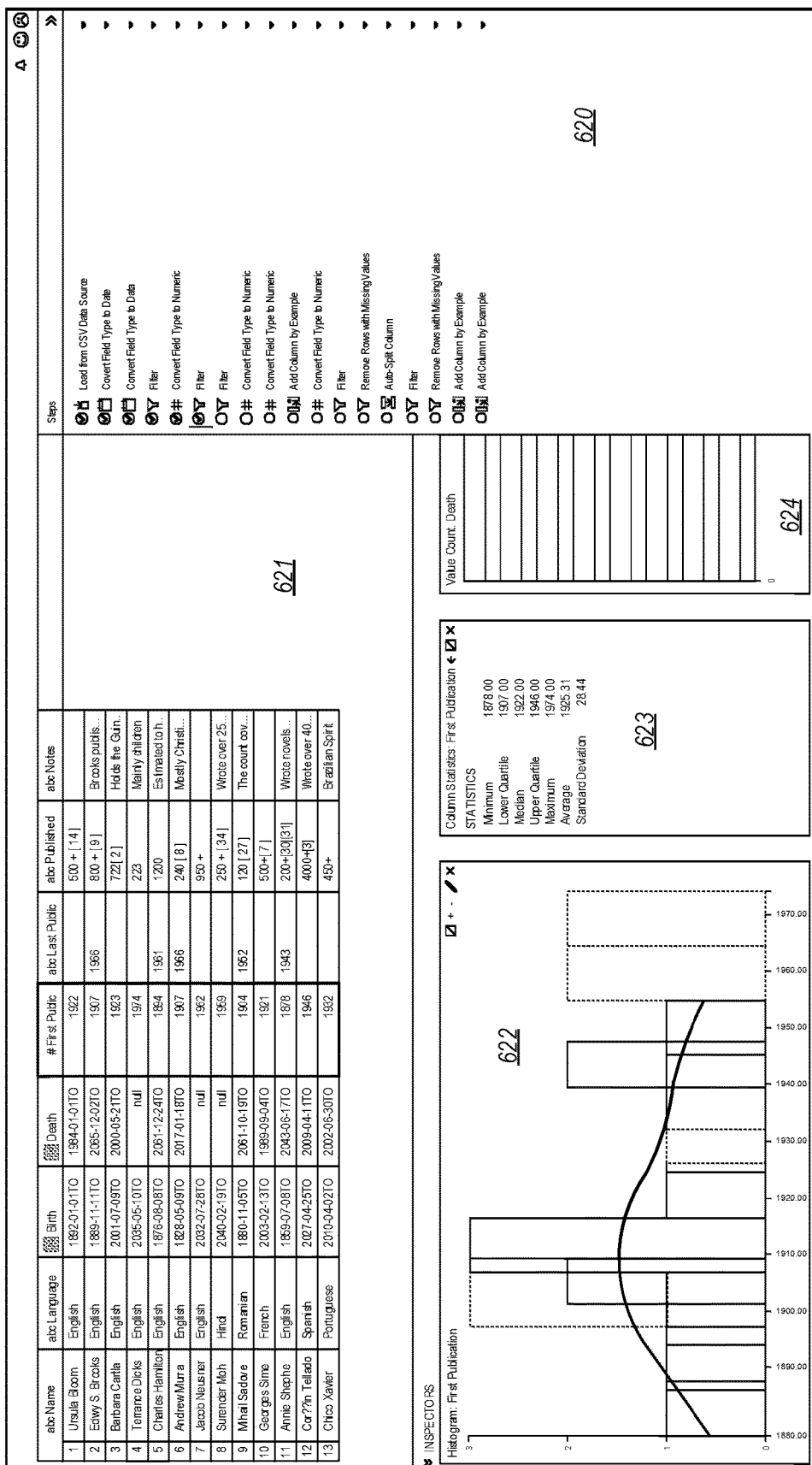

FIG. 9 illustrates the user interface 900 which shows how the user interface 800 of FIG. 8 changes if the user uses the navigation pane 620 to navigate to the sixth stage of preparation—a filtering stage. The histogram user interface shows a before (perhaps gray, but represented with dashed lines) and after (perhaps blue but represented as solid lines) view of what the histogram would look like upon performing the filter operation. The filtering has also changed the statistics displayed in the statistics user interface component 623. The sixth stage has not caused the view of the value count user interface component 624 to change.

Figure 10:
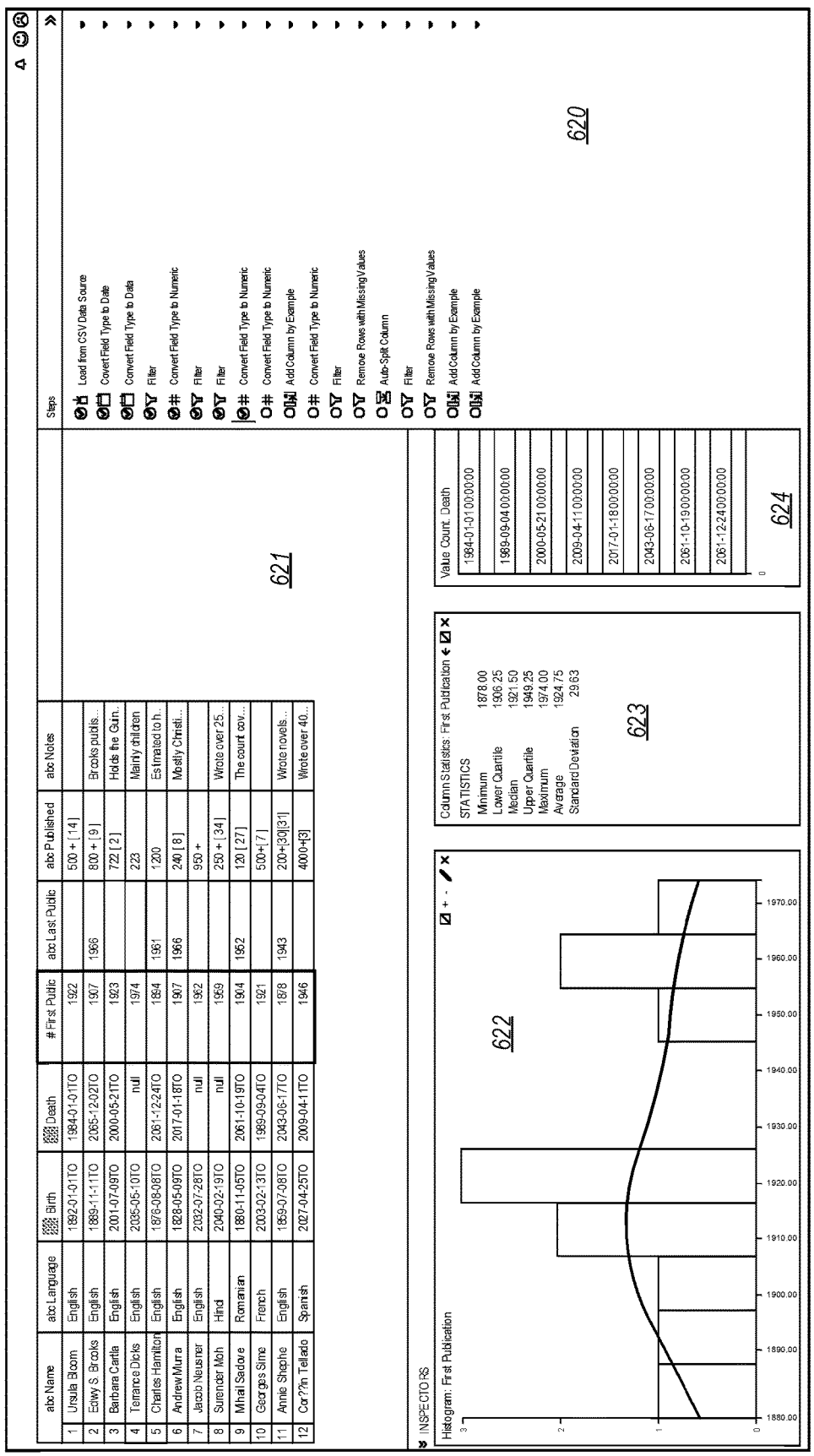

FIG. 10 illustrates the user interface 1000 which shows how the user interface 900 of FIG. 9 changes if the user uses the navigation page 620 to navigate through the seventh stage (another filtering stage) and to the eighth stage of preparation—a conversion of the selected field type to numeric. This filtering and conversion operations causes some changes to the content of the histogram user interface component 622, the statistics user interface component 623, and has now allowed the value count user interface component 624 to be populated.

Figure 11:
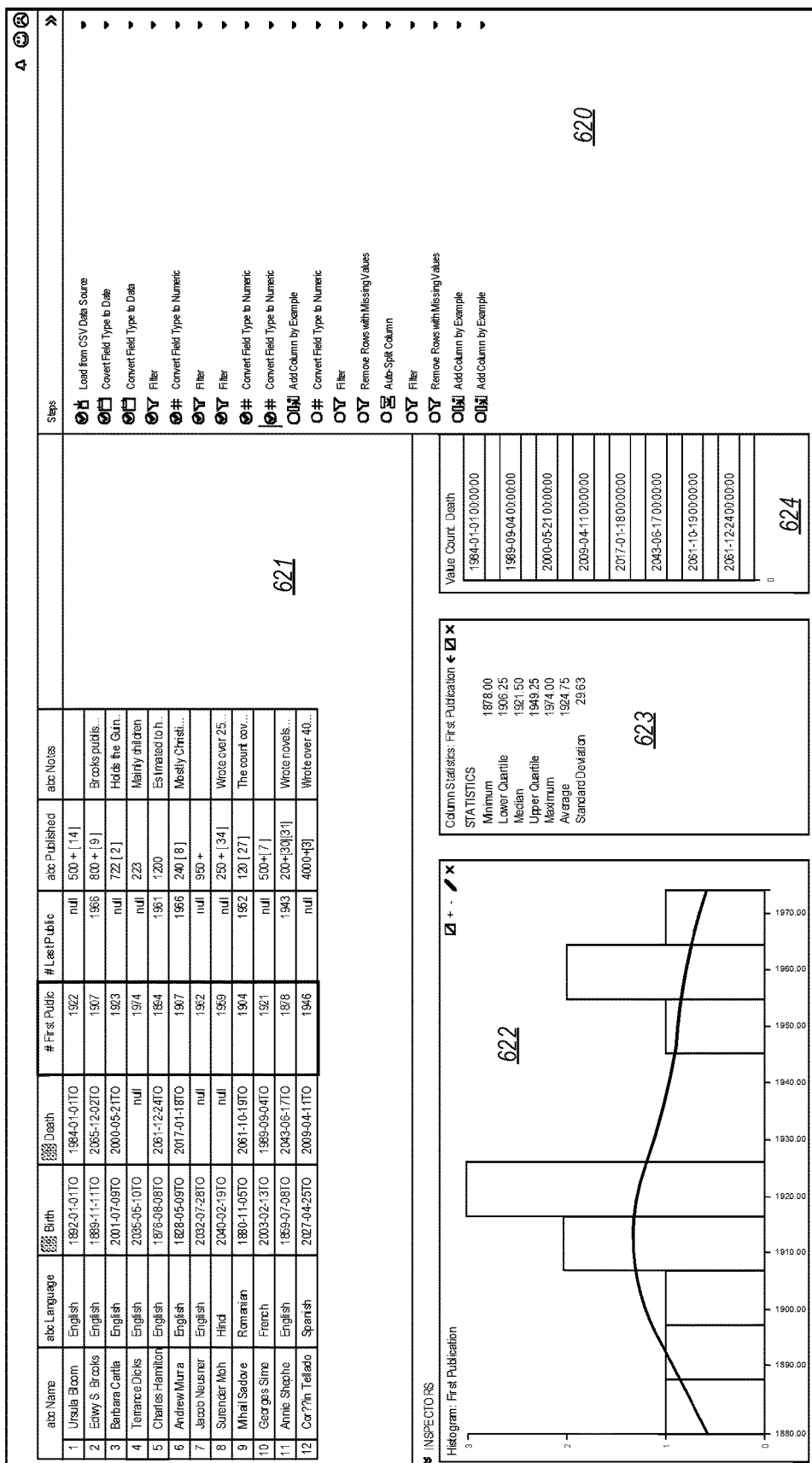

FIG. 11 illustrates the user interface 1100 which shows how the user interface 1000 of FIG. 10 changes if the user uses the navigation pane 620 to navigate to the ninth stage of operation, which again converts field types to a numeric field type, causing the underlying data set to change, which change propagates through all views, just as in all other stages.

Figure 12:
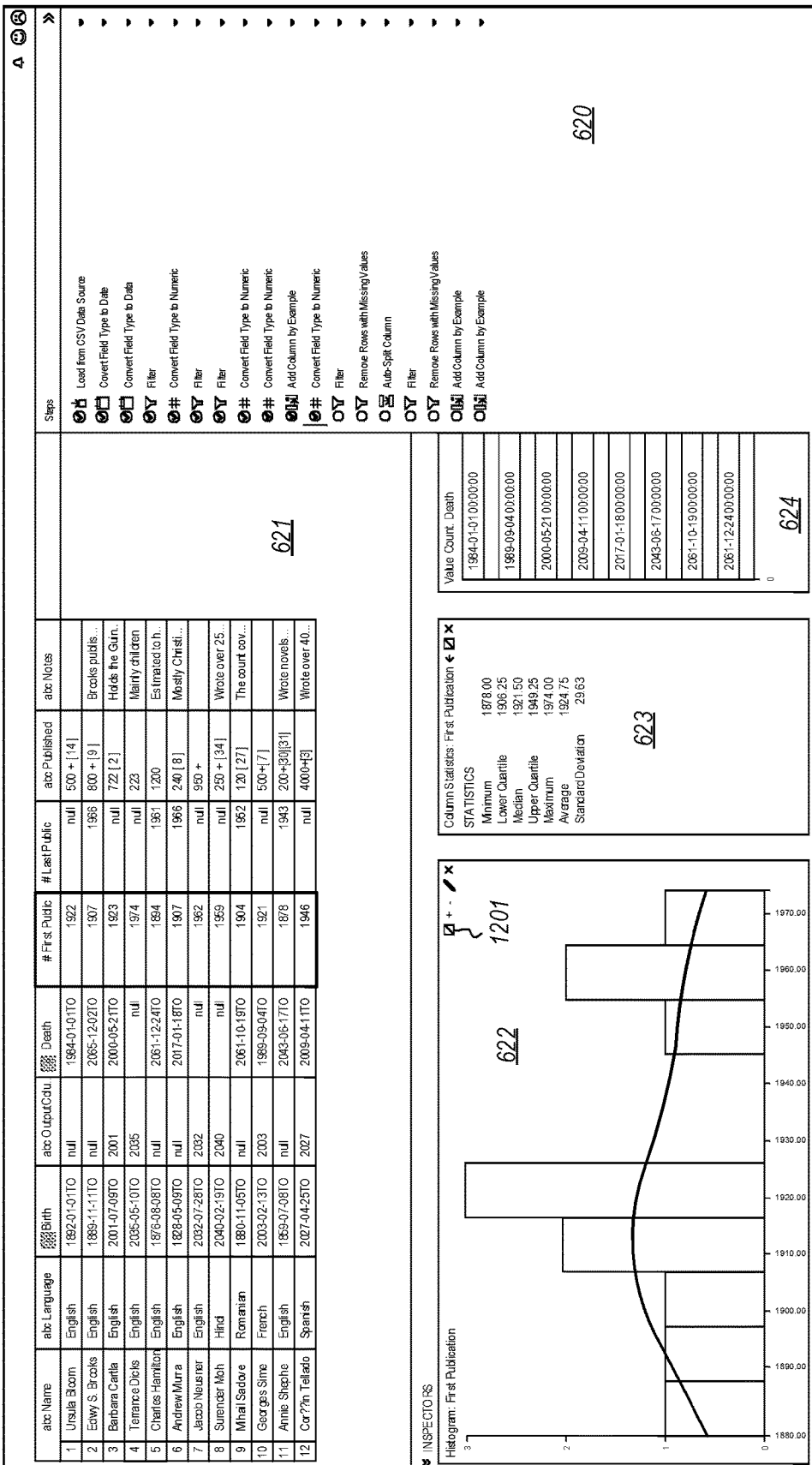
Figure 13:
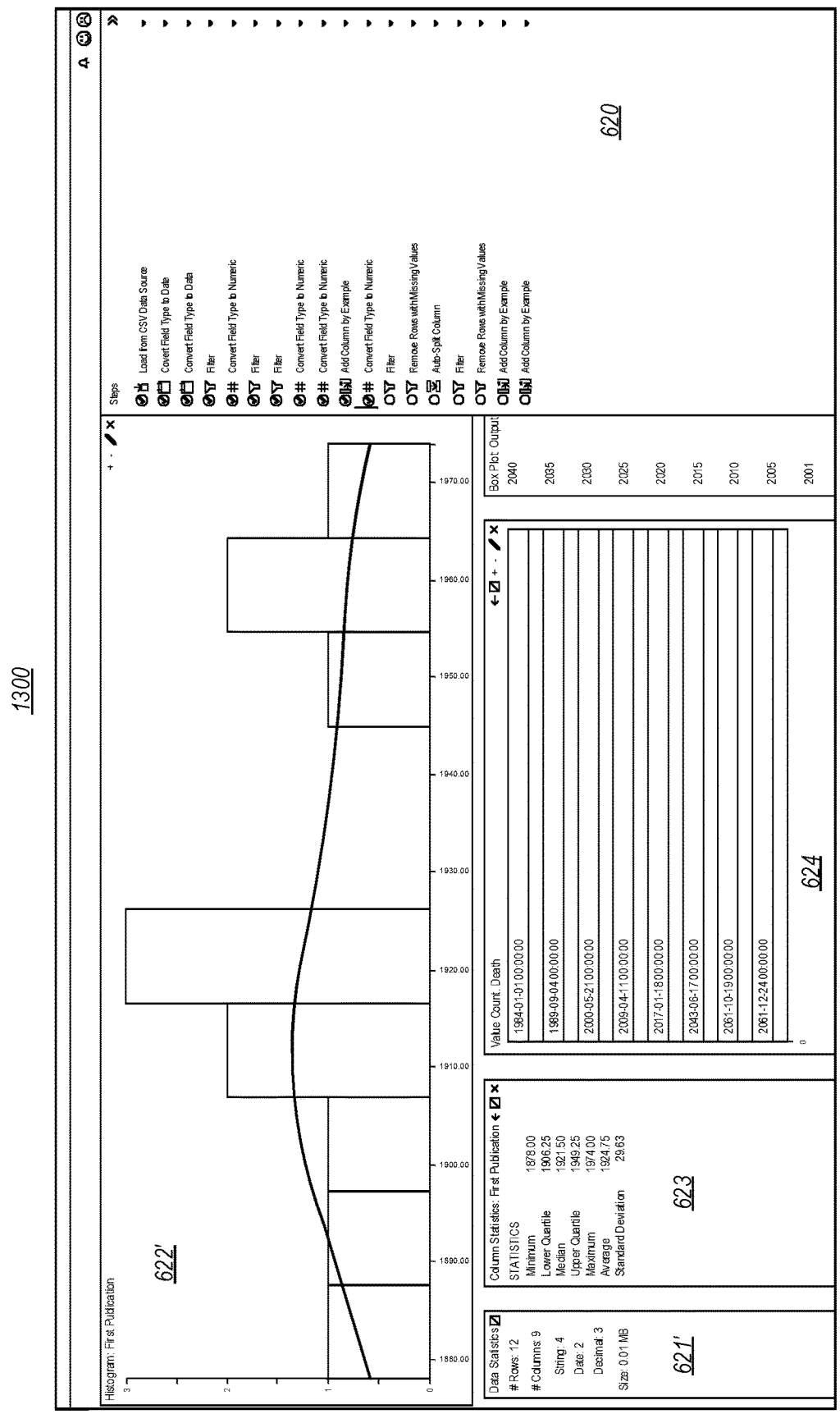

FIG. 12 illustrates the user interface 1200 which shows how the user interface 1100 of FIG. 11 changes if the user uses the navigation pane 620 to navigate to the eleventh stage of operation, which again converts field types to a numeric field type (after having added a column by example in the tenth stage), causing the underlying data set to change, which change propagates through all views, just as in all other stages. Now, suppose that the user selects a promotion control 1201 of the Histogram view 622. This results in the user interface 1300 of FIG. 13.

The promoted histogram view 622' is shown now in the larger pane, and thus shows further detail. The promotion control has now been removed from the histogram view 622' since that view is already promoted. Meanwhile, the histogram user interface component 622 has changed to a data statistics user interface view 621', now occupying the smaller pane.

Figure 14:
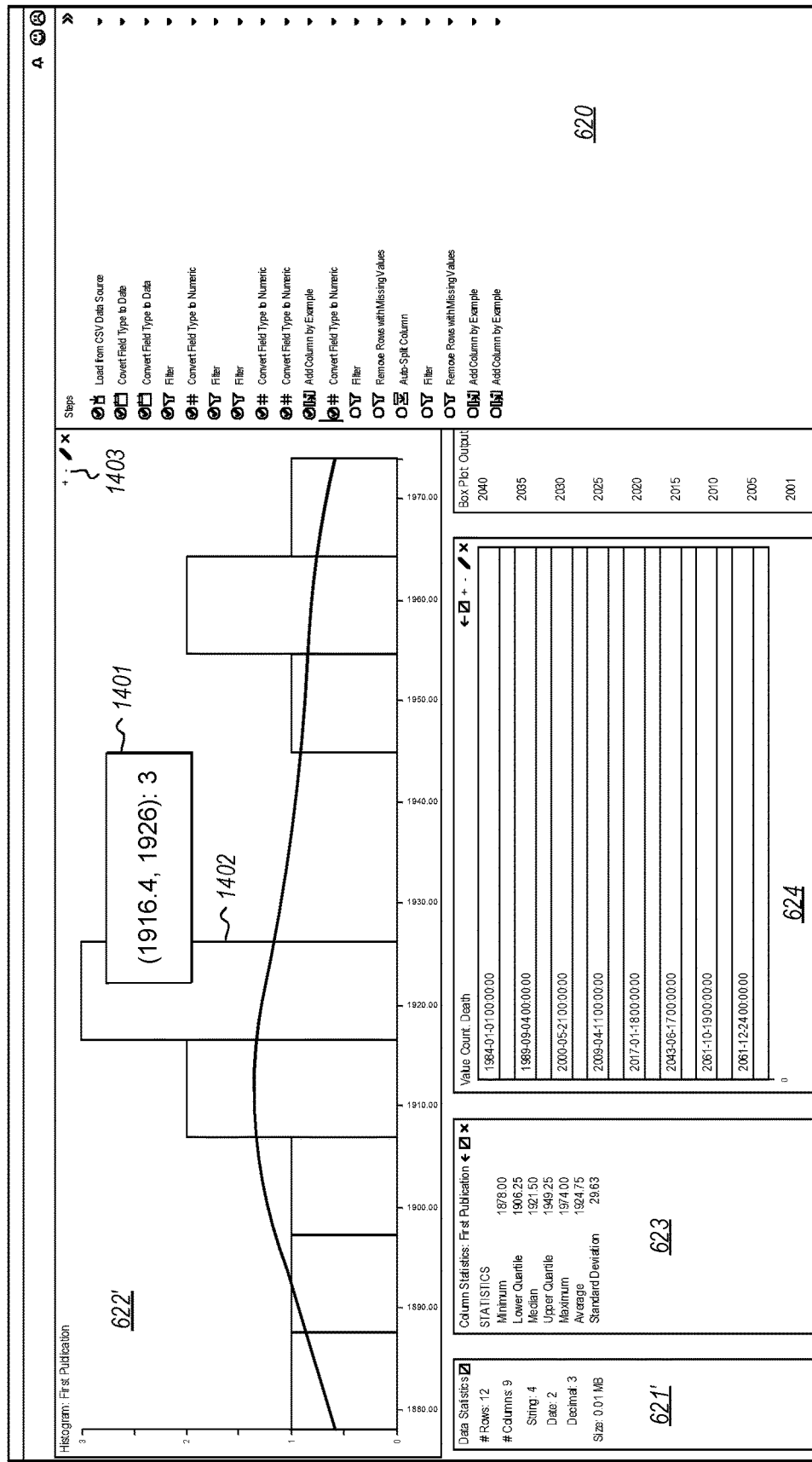

At this stage, even though this represents a prior stage in the data preparation, the user may select a different bar 1422 in the bar-chart view 1402 of FIG. 14. This causes underlying summary values of that selected portion to be shown without the popup box 1401. The user may then select to go in a different data preparation direction, by filtering on that newly selected portion (by selecting the filter control 1403).

Figure 15:
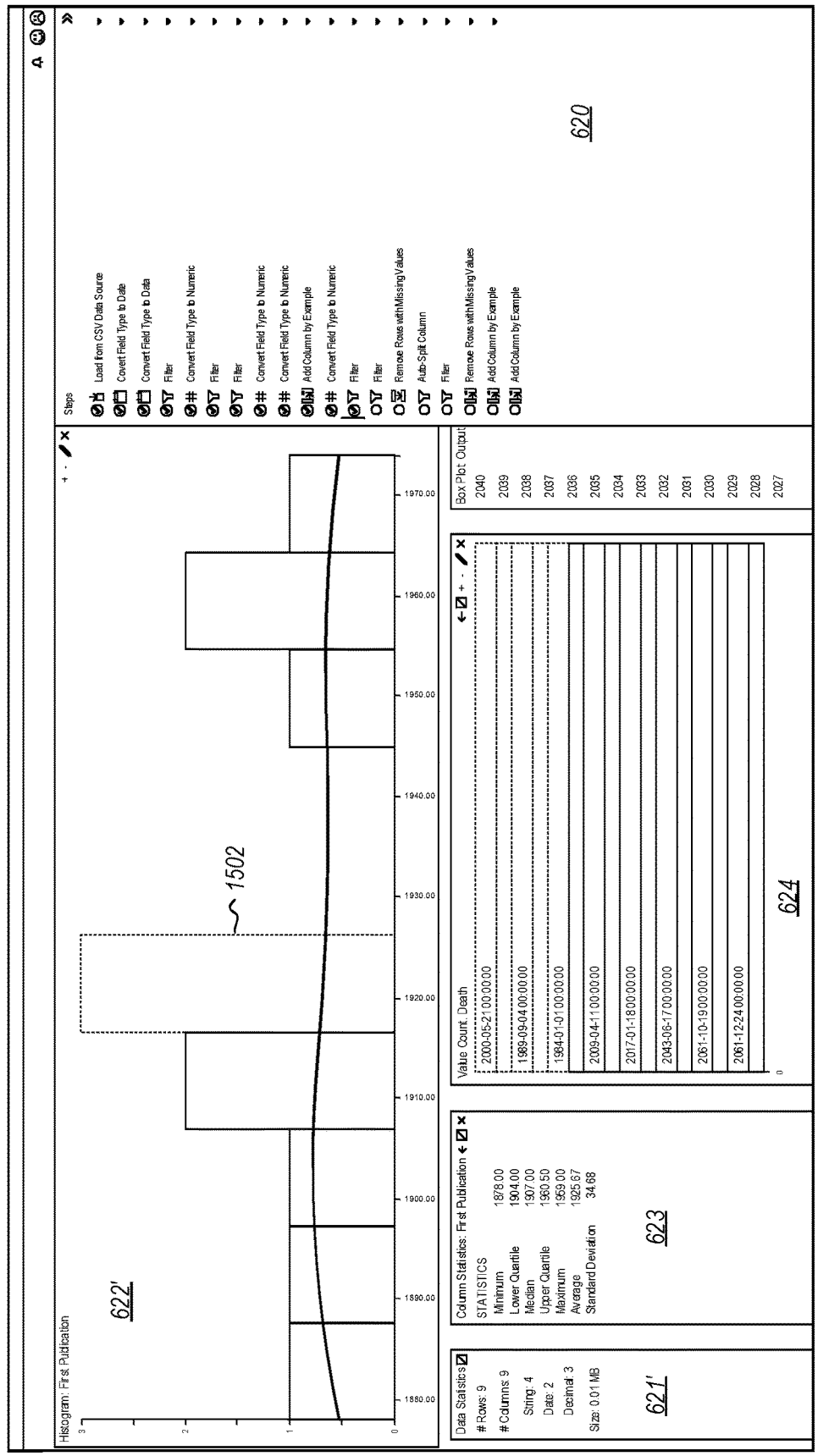

FIG. 15 illustrates the user interface 1500 after this filtering has been performed, which caused changes to the content to the data statistics view 621' and the column statistics view, and caused the three entries (the top three) in the value count view 624 corresponding to the selected bar to be highlighted.

Figure 16:
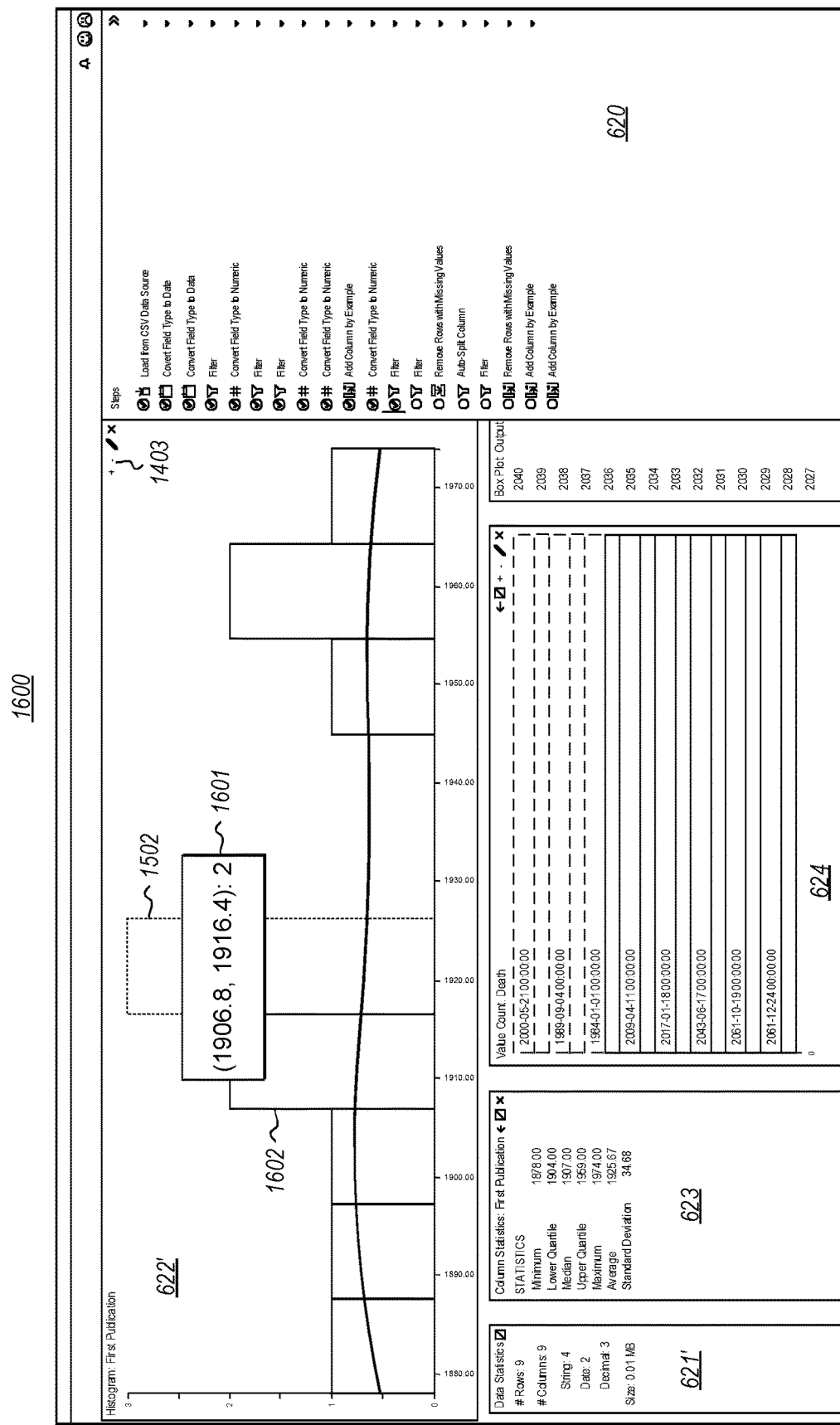
Figure 17:
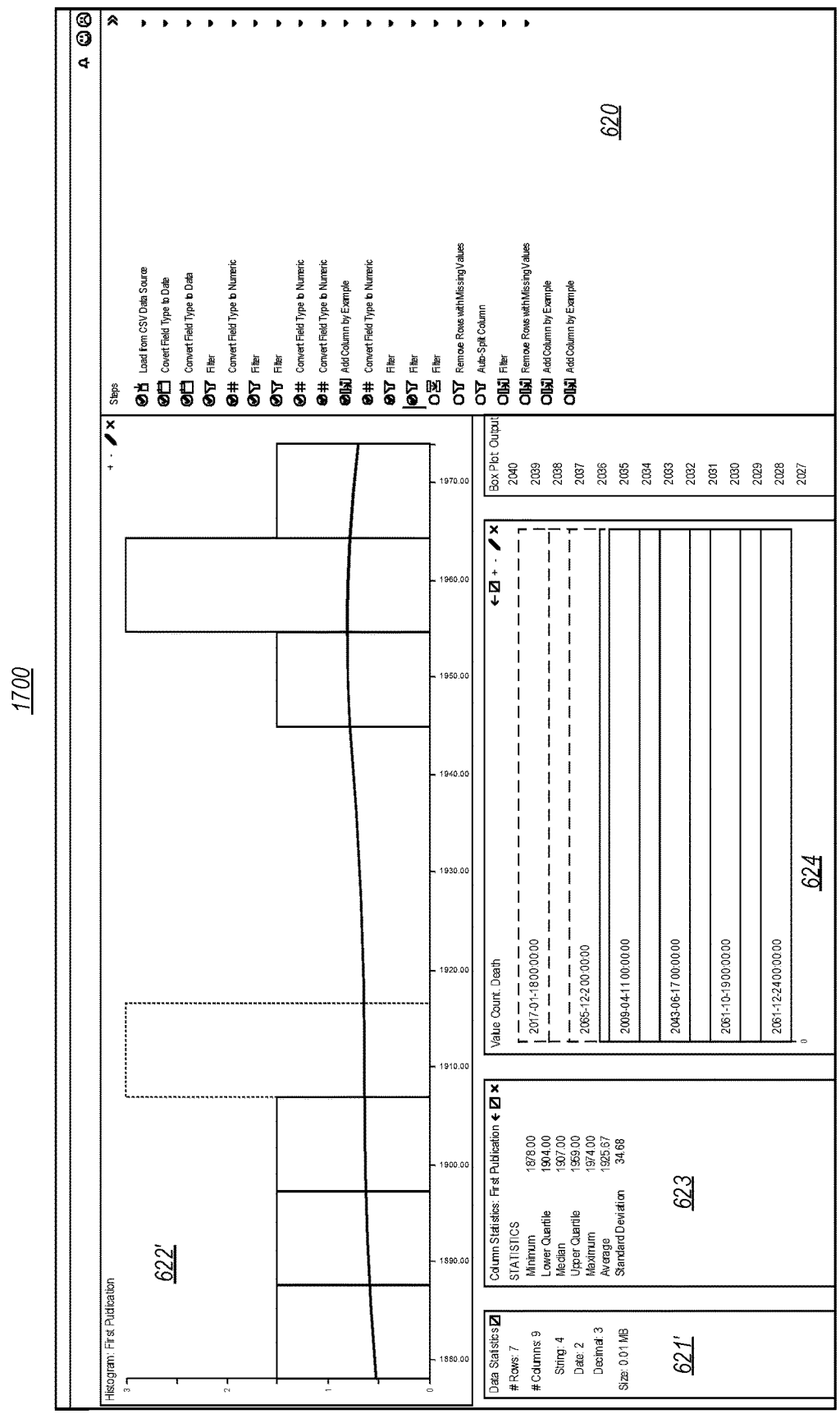
Figure 18:
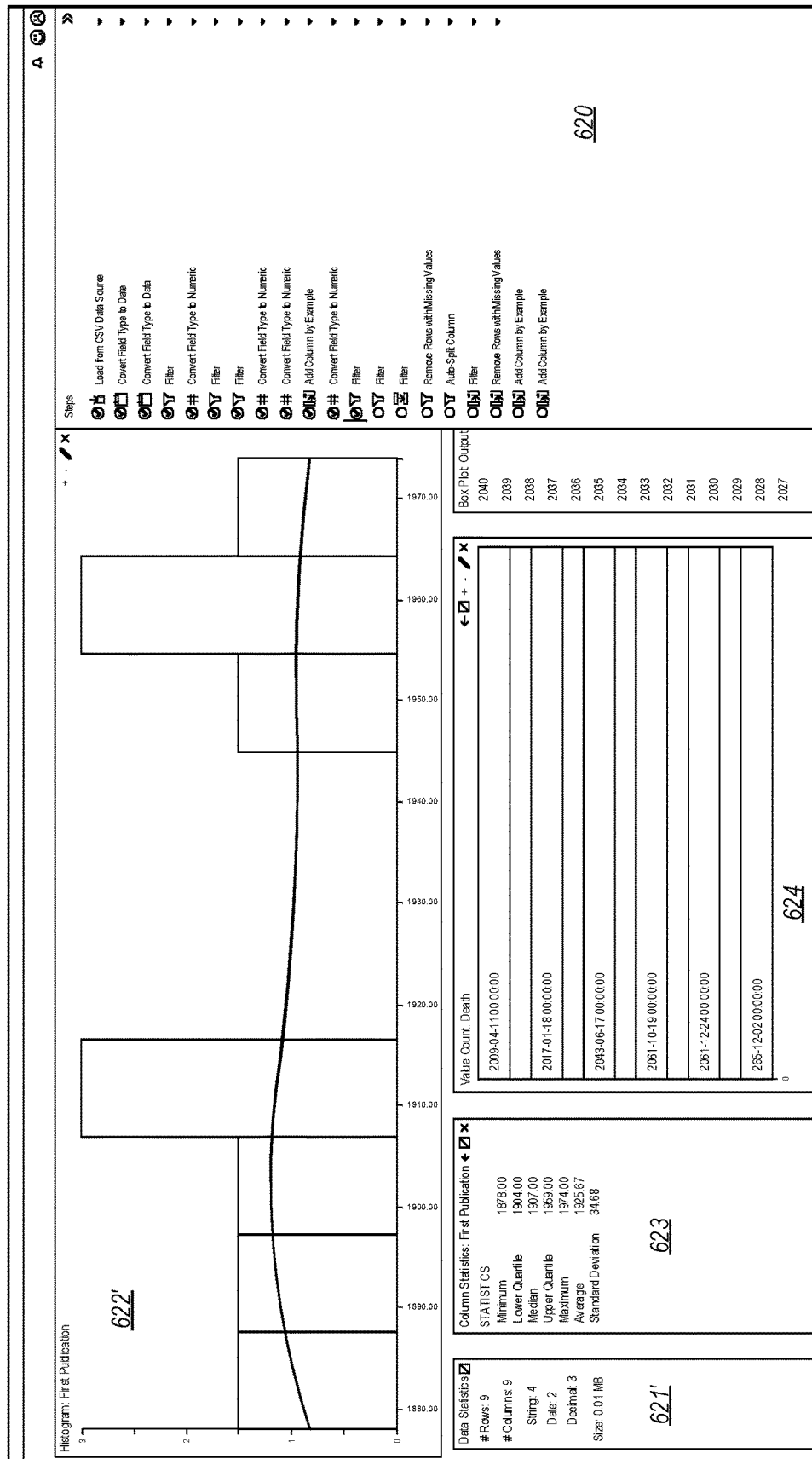

FIG. 16 illustrates the user interface after the user selects another bar 1602 of the bar chart view 622', causing a new detail popup to appear. The user may then select to filter on that newly selected portion (using the filter control 1403), causing the user interface 1700 of FIG. 17 to appear. FIG. 18 illustrates a user interface 1800 in which the user navigates to the prior filtering stage.

Accordingly, a user interface has been described that includes multiple components that each provide a view on the underlying data set, and also provide controls for editing or preparing the data set. The user interface components include a detail user interface component that displays a detail view on the data set, and one or more summary user interface components that each display a corresponding summary view on the data set. There is also a control that promotes a summary view on the data set to a detailed view on the data set, and corresponding changes the controls usable in the promoted detail view. This allows the user to have a wide variety of views on the data set, and corresponding controls appropriate for that view. Thus, the user can take the most efficient and intuitive approach to editing or preparing the data, thereby allowing data preparation to be more efficient, intuitive and likely correct.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A computing system comprising:
one or more processor(s); and
one or more computer-readable hardware storage media having stored thereon computer-executable instructions that are executable by the one or more processor(s) to cause the computing system to display a user interface comprising:
a plurality of user interface components, each user interface component displaying a different view of a data set, each of at least some of the plurality of views having one or more control(s) that, when selected, implement one or more change(s) to the data set;
a selection control for selecting a portion of a first view displayed on at least a particular one of the user interface components, wherein when the portion is selected, at least one of the other views in the one or more other user interface components changes to reflect the selection, and wherein changing the at least one other view to reflect the selected portion is performed by:
determining a first data type that is consumable by the at least one other view, and
upon determining that a second data type of the selected portion corresponds to the first data type, changing the at least one other view to reflect the selected portion, or, alternatively, upon determining that the second data type does not correspond to the first data type, changing the at least one other view to reflect an identified difference between the first and second data types;
a navigation control for causing the user interface components to display a second view on the data set as the data set existed at a prior stage, wherein the selection control remains continuously operative so as to be able to change the selected portion of the first view thereby changing at least one of the views in at least one of the one or more other user interface components, wherein:
the navigation control includes a navigation pane which is displayed simultaneously with the plurality of user interface components and which illustrates a plurality of listed items that simultaneously show multiple different alteration stages associated with the data set, each alteration stage included in the multiple different alteration stages, which are listed simultaneously with one another as the plurality of listed items and simultaneously with the plurality of user interface components, providing descriptive information regarding a corresponding individual edit that has been or that will be performed on the data set,
alteration stages that have already been performed against the data set are displayed differently than alteration stages that have not yet been performed but that will subsequently be performed against the data set, and
the plurality of listed items, which are included in the navigation pane, are displayed simultaneously with the plurality of user interface components.

2. The computing system in accordance with claim 1, the user interface further comprising:
an undo control for undoing preparation of the data set to return the data set itself to the prior stage navigated to with the navigation control.

3. The computing system in accordance with claim 1, wherein the changing of the data set comprising preparing the data set.

4. The computing system in accordance with claim 3, the preparing of the data set comprising removal of data.

5. The computing system in accordance with claim 3, the preparing of the data set comprising changing a format of data.

6. The computing system in accordance with claim 1, wherein one or more of the user interface components are capable of stacking multiple views so as to display on top a view most recently accessed by the particular user interface component.

7. The computing system in accordance with claim 6, the user interface further comprising:
an exposing control for exposing on top of the one or more user interface components a detail view of the multiple stacked views that was not previously on the top of the one or more user interface components.

8. The computing system in accordance with claim 7, wherein when the view is exposed in the one or more user interface components, at least one other view of the one or more user interface components also changes to correspond to the newly exposed view.

9. The computing system in accordance with claim 7, the exposing control comprising a minimize control that minimizes the view that was on the top of the one or more user interface components to expose an immediately underlying view in the one or more user interface components.

10. The computing system in accordance with claim 7, the exposing control comprises a close control that closes the view that was on top of the one or more user interface components to expose an immediately underlying view in the one or more user interface components.

11. The computing system of claim 1, wherein the user interface is further configured to:
   display an additional marker proximately to a currently-implemented alteration stage that is currently being performed against the data set.

12. A method for causing a user interface to be displayed on a display of a computing system, the method comprising:
   causing a plurality of user interface components to be displayed, each user interface component displaying a different view of a data set, each of at least some of the plurality of views having one or more control(s) that, when selected, implement one or more change(s) to the data set;
   providing a selection control to be displayed for selecting a portion of a first view displayed on at least a particular one of the user interface components, wherein when the portion is selected, at least one of the other views in the one or more other user interface components changes to reflect the selection, and wherein changing the at least one other view to reflect the selected portion is performed by:
      determining a first data type that is consumable by the at least one other view, and
      upon determining that a second data type of the selected portion corresponds to the first data type, changing the at least one other view to reflect the selected portion, or, alternatively, upon determining that the second data type does not correspond to the first data type, changing the at least one other view to reflect an identified difference between the first and second data types; and
   providing a navigation control to be displayed for causing the user interface components to display a second view on the data set as the data set existed at a prior stage, wherein the selection control remains continuously operative so as to be able to change the selected portion of the first view thereby changing at least one of the views in at least one of the one or more other user interface components, and wherein:
      the navigation control includes a navigation pane which is displayed simultaneously with the plurality of user interface components and which illustrates a plurality of listed items that simultaneously show multiple different alteration stages associated with the data set, each alteration stage included in the multiple different alteration stages, which are listed simultaneously with one another as the plurality of listed items and simultaneously with the plurality of user interface components, providing descriptive information regarding a corresponding individual edit that has been or that will be performed on the data set,
      alteration stages that have already been performed against the data set are displayed differently than alteration stages that have not yet been performed but that will subsequently be performed against the data set, and
      the plurality of listed items, which are included in the navigation pane, are displayed simultaneously with the plurality of user interface components.

13. The method in accordance with claim 12, the user interface further comprising:
   an undo control for undoing preparation of the data set to return the data set itself to the prior stage navigated to with the navigation control.

14. The method in accordance with claim 12, wherein the changing of the data set comprising preparing the data set.

15. The method in accordance with claim 14, the preparing of the data set comprising removal of data.

16. The method in accordance with claim 14, the preparing of the data set comprising changing a format of data.

17. The method in accordance with claim 12, wherein one or more of the user interface components are capable of stacking multiple views so as to display on top a view most recently accessed by the particular user interface component.

18. The method in accordance with claim 17, the user interface further comprising:
   an exposing control for exposing on top of the one or more user interface components a detail view of the multiple stacked views that was not previously on the top of the one or more user interface components.

19. The method in accordance with claim 18, wherein when the view is exposed in the one or more user interface components, at least one other view of the one or more user interface component also changes to correspond to the newly exposed view.

20. The method in accordance with claim 18, the exposing control comprising a minimize control that minimizes the view that was on the top of the one or more user interface components to expose an immediately underlying view in the one or more user interface components.

21. A computer program product comprising one or more computer-readable storage media having stored thereon computer-executable instructions that are structured such that, when executed by one or more processor(s) of a computing system, the computing system is caused to perform a method for causing a user interface to be displayed on a display of the computing system, the method comprising:
   causing a plurality of user interface components to be displayed, each user interface component displaying a different view of a data set, each of at least some of the plurality of views having one or more control(s) that, when selected, implement one or more change(s) to the data set;
   providing a selection control to be displayed for selecting a portion of a first view displayed on at least a particular one of the user interface components, wherein when the portion is selected, at least one of the other views in the one or more other user interface components changes to reflect the selection, and wherein changing the at least one other view to reflect the selected portion is performed by:
      determining a first data type that is consumable by the at least one other view, and
      upon determining that a second data type of the selected portion corresponds to the first data type, changing the at least one other view to reflect the selected portion, or, alternatively, upon determining that the second data type does not correspond to the first data type, changing the at least one other view to reflect an identified difference between the first and second data types; and
   providing a navigation control to be displayed for causing the user interface components to display a second view on the data set as the data set existed at a prior stage, wherein the selection control remains continuously operative so as to be able to change the selected portion of the first view thereby changing at least one of the views in at least one of the one or more other user interface components, and wherein:

the navigation control includes a navigation pane which is displayed simultaneously with the plurality of user interface components and which illustrates a plurality of listed items that simultaneously show multiple different alteration stages associated with the data set, each alteration stage included in the multiple different alteration stages, which are listed simultaneously with one another as the plurality of listed items and simultaneously with the plurality of user interface components, providing descriptive information regarding a corresponding individual edit that has been or that will be performed on the data set, alteration stages that have already been performed against the data set are displayed differently than alteration stages that have not yet been performed but that will subsequently be performed against the data set, and the plurality of listed items, which are included in the navigation pane, are displayed simultaneously with the plurality of user interface components.

\* \* \* \* \*